United States Patent [19]

Scharnweber et al.

[11] Patent Number: 4,969,432
[45] Date of Patent: Nov. 13, 1990

[54] TORCH IGNITOR FOR LEAN BURN ENGINES

[75] Inventors: David H. Scharnweber, Milford; Lyle O. Hoppie, West Bloomfield; Donald R. Haefner, Oak Park, all of Mich.

[73] Assignee: Eaton Corporation, Cleveland, Ohio

[21] Appl. No.: 290,970

[22] Filed: Dec. 28, 1988

[51] Int. Cl.⁵ .............................. F02M 51/00
[52] U.S. Cl. .................... 123/143 B; 123/538
[58] Field of Search ............ 123/297, 538, 143 B, 123/305

[56] References Cited

U.S. PATENT DOCUMENTS

| | | | |
|---|---|---|---|
| 4,176,637 | 12/1979 | Cole | 123/538 |
| 4,203,398 | 5/1980 | Marouka | 123/538 |
| 4,380,978 | 4/1983 | Maynard et al. | 123/538 |

Primary Examiner—Andrew M. Dolinar
Assistant Examiner—M. Macy
Attorney, Agent, or Firm—John R. Benefiel; Gordon Lewis

[57] ABSTRACT

A torch ignitor for a lean burn internal combustion engine is disclosed in which a small quantity of gaseous fuel is activated by exposure to an electrical arc and injected into the main fuel air charge in the combustion chamber. The arc is established by causing a current to flow to a pair of electrodes which are separated by the application of the torch fuel under pressure to generate the arc. The arc is caused to migrate about the space between the electrodes by the impingement of the fuel flowing through the space.

12 Claims, 3 Drawing Sheets

TORCH IGNITOR FOR LEAN BURN ENGINES

FIELD OF THE INVENTION

This invention concerns igniters and more particularly ignitors in which a small quantity of burning fuel is utilized to ignite a main fuel charge in a combustion chamber as of an internal combustion engine.

BACKGROUND OF THE INVENTION

Conventional Otto cycle internal combustion engines utilize spark ignition to ignite the fuel-air charge. There has been developed the so called "lean burn" engines, in which a very lean mixture is run to obtain various improvements in efficiency and emissions performance. Lean mixtures are difficult to ignite, and conventional spark ignition does not perform satisfactorily for such engines. Sophisticated stratified charge engines have been developed to solve the ignition problem by establishing a rich mixture in the region at which ignition occurs, but in effect this approach is a compromise of the improvements possible with a lean burn engine, and adds complexity in its implementation.

Another approach is to provide auxiliary combustion chambers in which a small quantity of a rich mixture is ignited to act as a torch in igniting the main charge.

This approach has entailed the use of extra valves to insure that the exhaust products are eliminated with each engine cycle.

High energy spark ignition systems have also been developed to solve the ignition problem, producing a jet of burning fuel, these devices referred to as, "plasma torch" ignitors. High currents in the arc relied on in these devices lead to excessive erosion of the electrodes across which the arc is discharged.

U.S. Pat. No. 4,757,788 describes the injection of fuel onto "make and break" electrodes between which an arc was previously established to ignite the fuel relied on to aid ignition of lean burn engines, which in effect operates as a stratified charge in having a localized rich mixture combustion.

U.S. Pat. No. 4,582,475, assigned to the same assignee as the present application describes "activation" of fuel by passing the fuel through a corona discharge and forming radicals of the fuel molecules to a concentration at which ignition of the fuel charge will occur upon introduction into an oxidizing atmosphere.

U.S. Pat. No. 4,672,938, also assigned to the same assignee as the present application, discloses activation prior to combustion by an electrical discharge including an electrical arc.

It is an object of the present invention to provide a torch ignition device for lean burn engines which does not require auxiliary combustion chambers or involve localized rich mixtures, or high voltage ignitors subject to high rates of electrode erosion.

SUMMARY OF THE INVENTION

This and other objects of the present invention which will become apparent upon a reading of the following specification and claims are achieved by a low voltage movable electrode arrangement for establishing a sustained electrical arc in a space through which a small quantity of gaseous fuel is passed prior to injection into the combustion chamber of a lean burn internal combustion engine. The small quantity of gaseous fuel is rapidly activated to produce a high concentration of fuel molecule radicals by exposure to the arc so as to instantaneously ignite upon injection and coming into contact with the compressed air in the combustion chamber. This quantity of activated fuel upon combusting acts as a torch to ignite the main pre-mixed fuel and air charge.

The movable electrodes preferably have annular contacts which define an annular space when separated through which the fuel passes, and a vortical flow of the fuel is induced to cause the arc to migrate around the annular space. The arc migration causes maximum exposure of the fuel quantity to the activating effect of the arc, mixes the radicals, and minimizes electrode erosion.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
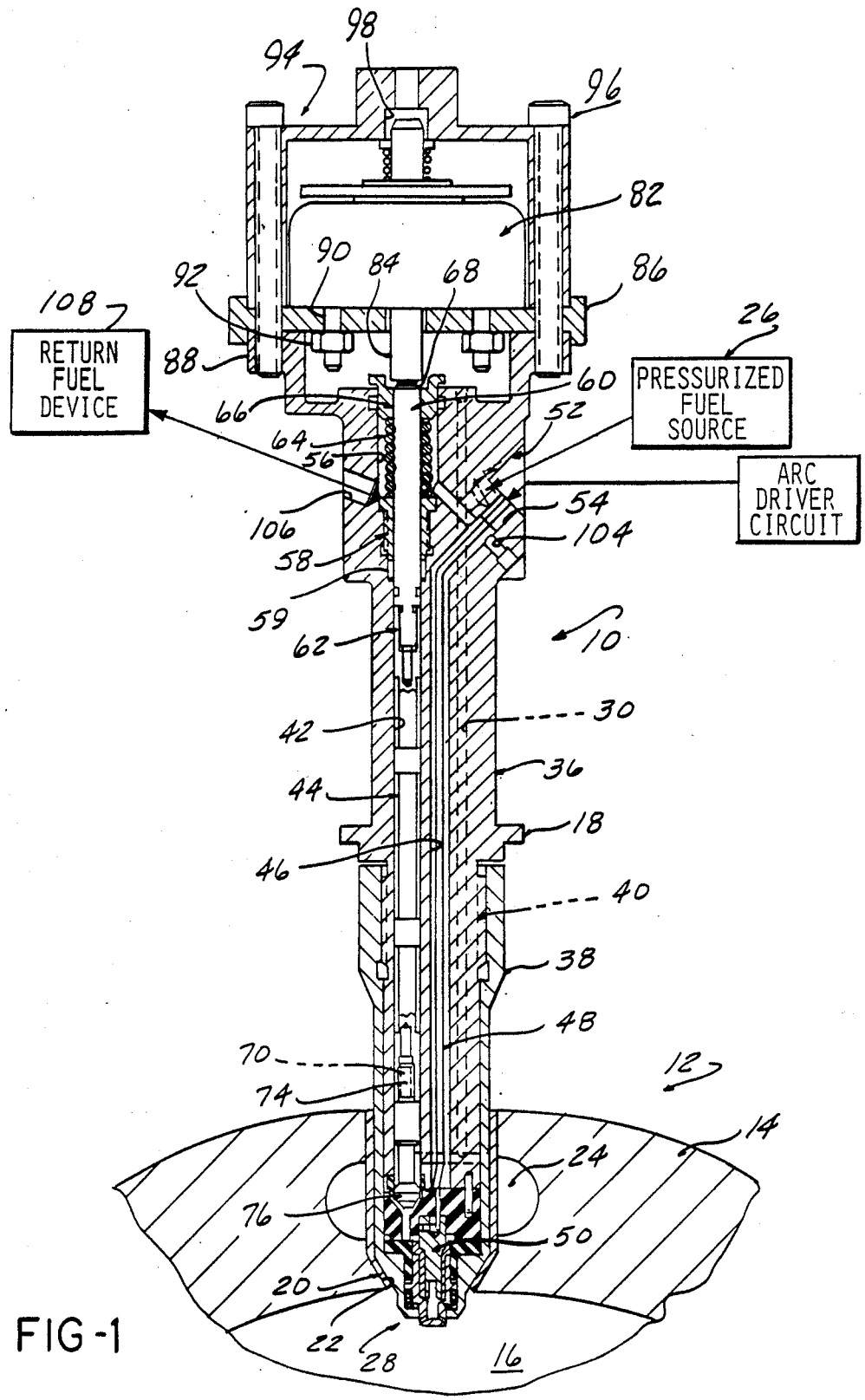
FIG. 1 is a lengthwise sectional view of a torch ignitor fuel injector according to the present invention, with a fragmentary sectional view of an engine combustion chamber into which the injector is installed.

Referring to FIG. 1, the torch ignitor apparatus according to the present invention here takes the form of an ignitor 10, and is shown installed in an internal combustion engine 12, having a combustion chamber 16.

The ignitor 10 may be held in place by means of well known clamping devices (not shown) acting on a clamping flange 18 to force a tapered sleeve 20 into a tapered seat 22. A coolant passage 24 may be provided to directly expose sleeve 20 to cooling fluid, in a manner well known in connection with Diesel engine fuel injectors. A main charge of fuel and air is introduced into the combustion chamber 16 during each engine cycle, and the products of combustion expelled after each cycle as by conventional intake and exhaust valves and manifolding (not shown).

Gaseous fuel is supplied under pressure from a source 26. The gaseous fuel may be vaporized gasoline or diesel fuel, or a gas such as methane under sufficient pressure to be injected into the main fuel-air charge compressed in the combustion chamber 16. Suitable compressors are well known in the field able to supply vapor or gaseous fuel at 1500–3000 psig.

A small quantity of fuel (relative to the quantity of fuel in the main fuel air charge) is injected into the combustion chamber from the tip end 28 of the ignitor 10, properly timed with respect to the engine cycle. Electromechanical valving (described herein) contained within the ignitor 10 controls communication between an internal fuel passage 30 with the combustion chamber 16 to control the flow of fuel thereinto.

The ignitor 10 is constructed of two major pieces, an upper housing member 36 having the holding flange 18 integral therewith, and an outer retainer sleeve 38 threaded at 40 onto the housing member 36. The tapered sleeve 20 is received over the exterior of the retainer sleeve 38 and held in position by the clamping mechanism (not shown), preferably constructed of copper to have good thermal conductivity to conduct heat into the engine coolant. Housing member 36 is formed with three lengthwise bores, a first bore 30 constituting a fuel passage, a second bore 42 receiving a segmented valve operating rod assembly 44 and a third bore 46 through which a power cable 48 passes to be connected to an electrode 50.

The fuel passage 30 connects to port 52 adapted to receive a suitable fitting (not shown), while electrode passage 46 extends to a cross bore 54 exiting the housing member 36.

Figure 2:
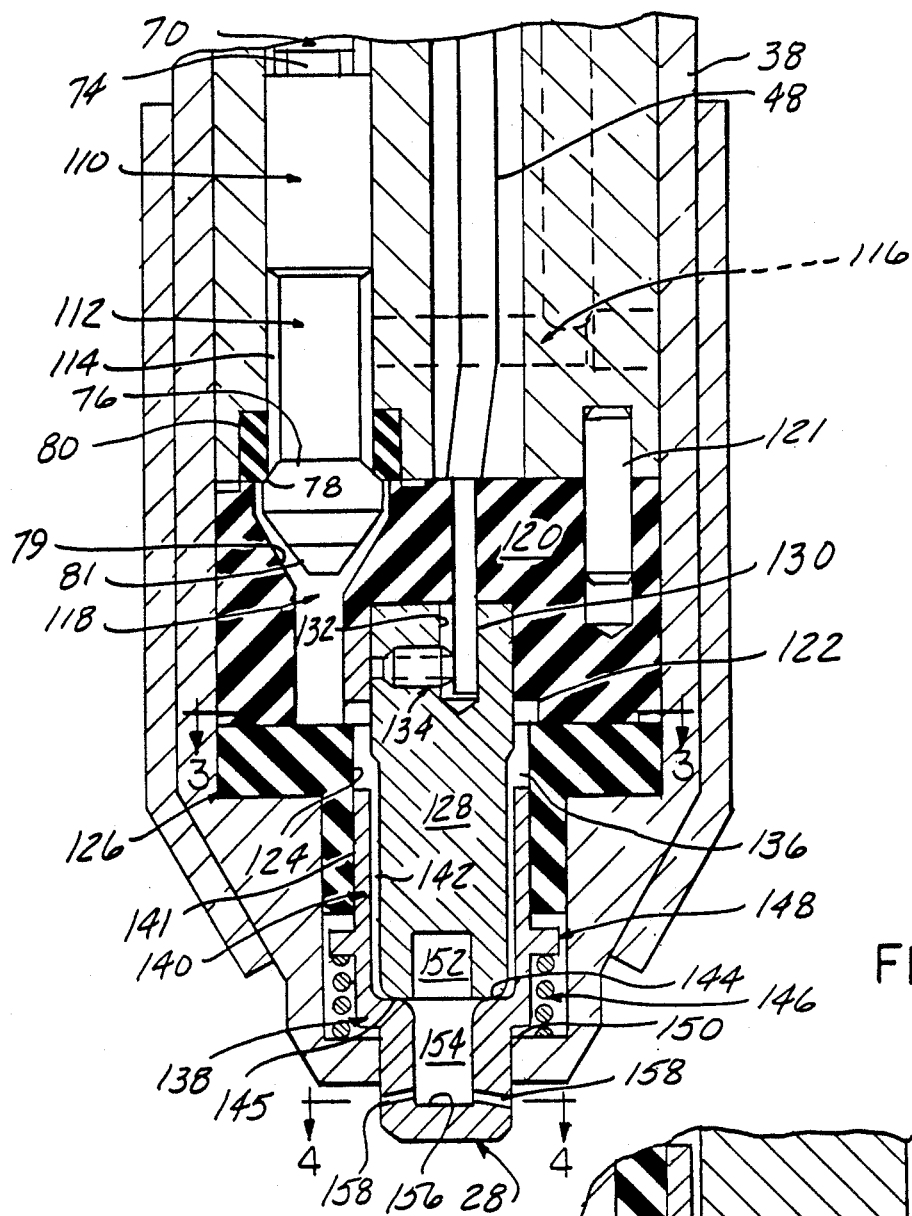
FIG. 2 is an enlarged view of the injector shown in FIG. 1.

The second bore 42 enters into an enlarged bore 56 receiving a bushing 58, in turn guiding movement of a plunger pin 60 threaded at 62 to the segmented valve operator rod 44. A compression spring 64 bears against a flange piece 66 held with a snap ring 68 to urge the plunger pin 60 and operator rod 44 upwardly. As shown in FIGS. 1 and 2, the segmented actuator rod 44 is threaded at 70 to the stem 74 of a generally conical valve member 76 which seats against an annular surface 78 of a valve seat 80 under the urging of the compression spring 64.

A solenoid 82 has an operator rod 84 bearing against the plunger pin 60 and is advanced downward upon energization thereof, so that the force of the compression spring 64 is overcome and the valve member 76 lifted off surface 78 to allow fuel to pass by.

The solenoid 82 is mounted to a plate 86 secured to an end flange 88 by studs 90 and nuts 92. A cap 94 is secured over the solenoid 82 by capscrews 96 which are received in the end flange 88. Cap 94 includes a pilot bore 98 receiving the opposite end of the operator rod 84.

Leakage of fuel vapor past the actuator rod 44 and from bore 46 are collected via cross passage 104 and port 106 by a fuel return device 108 to prevent vapors passing the seals from reaching the solenoid 82.

The valve stem 74 includes a land slidably mounted in bore 42, and a reduced diameter portion 112 creating an annular clearance space 114 communicating with a cross bore 116 extending from bore 30 supplied with fuel. The land 110 creates a pressure balance, when the valve member 76 is closed, reducing the actuating forces, but biases the valve member 76 closed when opened to increase the speed of closing. The configuration of the converging surface 81 of the valve member 76 and diverging section 79 of a bore 118 downstream of the seat 78 is preferably designed to provide a uniform flow area to preclude a restriction effect on flow and resulting shock wave reflections and pressure losses.

Thus, when the valve member 76 is moved downwardly, pressurized fuel enters bore 118 formed in an electode holder 120, constructed to be electrically insulating as of 5030 TORLON.

Figure 3:
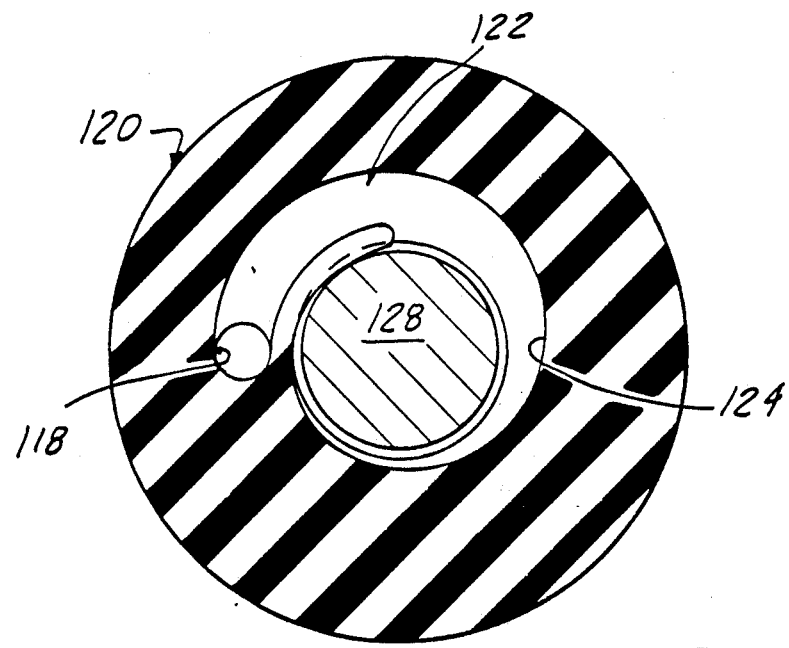
FIG. 3 is an enlarged view of the transverse section 3—3 taken in FIG. 2.

Bore 118 terminates in a spirally shaped recess 122 (FIG. 3) which converges about a bore 124 formed in a fitting 126 abutting against the electrode holder 120.

A first electrode 128 is fixed at one end in the electrode holder 120, receiving a conductor 130 from cable 48 in socket 132, secured therein with set screw 134.

The first electrode 128 protrudes down into the bore 124 with an annular clearance space 136 defining an axial fuel flow passage. The spiral shape of recess 122 insures a uniform axial - tangential component of the fuel flow into the passage 136 to maintain the vortical flow therein to the maximum extent possible.

A second axially aligned electrode 138 has an upwardly extending tubular skirt portion 140 telescoped over the first electrode 128, with a clearance space 142 therebetween, also defining an annular fuel flow passage.

A shoulder is formed by the rim 144 of an open-ended cavity 154 within the second electrode 138 and contacts the rim 145 of an open ended cavity 152 extending axially into the free end of the fixed electrode 128. An encircling spring 146 acts between a flange portion 148 and an interior end wall 150 of the retainer sleeve 38 to urge the second electrode upwardly to position rim 145 of the first electrode 128 into engagement with rim 144 of the second electrode 138.

The cavity 154 of the second electrode 138 terminates in end wall 156, and a series. of tangential orifices 158 enable outflow of activated fuel into the combustion chamber 16. The tangential geometry takes advantage of the momentum of the vortical flow of the fuel (described below) to cause a forceful exit of the activated fuel into the combustion chamber 16.

Upon energization of the solenoid 82 and lowering of valve member 76 away from valve seat 78, pressurized fuel passes into bore 118, pressurizing spiral recess 122.

The pressure exerted by the fuel therein moves the movable second electrode 138 downwardly away from the relatively fixed upper electrode 128, unseating contact between the rim 145 and rim 144.

An electric current having previously been established along conductor 130, first electrode 128, and second electrode 138 by a circuit described hereinafter, an arc will be drawn, momentarily extending across the annular space or gap between the rounded edges of the rim 145 and rim 144.

Figure 5:
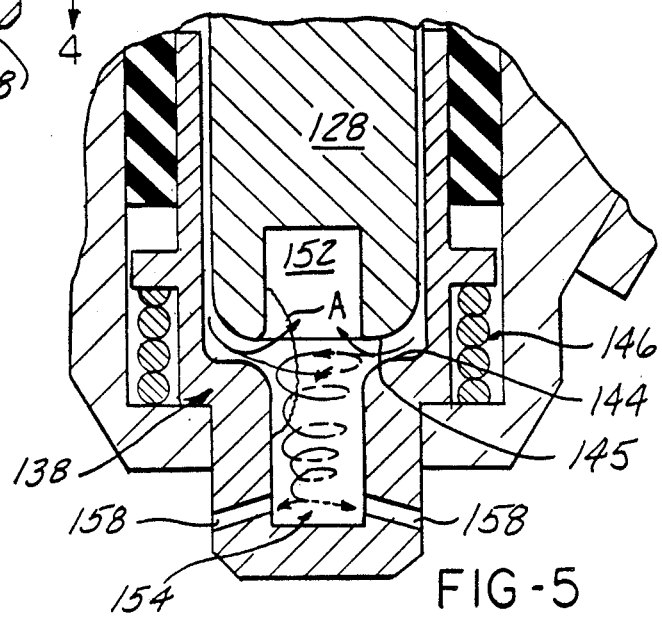
FIG. 5 is a further enlarged fragmentary sectional view of the electrode portions of the fuel injector.

Fuel flowing through spiral recess 122, sets up a vortical flow in annular space 142, which flows through the gap between the now separated first electrode 128 and second electrode 138, this fluid flowing with a momentum having a major tangential component as depicted in FIG. 5.

Figure 4:
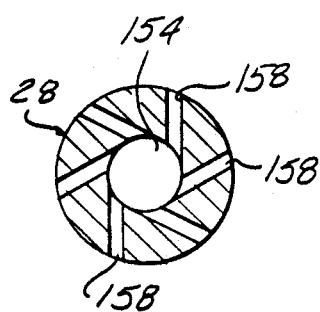
FIG. 4 is an enlarged view of the transverse section 4—4 taken in FIG. 2.

The inward and reentrant direction of flow between end face 145 and shoulder 144 forces the arc (A) away from those surfaces, the radial inflow causing the arc to migrate to extend from the surfaces of the cavities 152, 154 as shown in FIG. 4. The arc thus increases greatly in length.

It is noted that in order for the arc to have good mobility and respond to the aerodynamic action of the fuel flow, a gap of at least approximately .040 inches is desirable between the separated rims 144 and 145.

In addition, the tangential component of the fluid momentum of the fuel flow causes the arc to sweep around the annular space between the separated electrodes 128 and 138.

Combined with the tangential component of flow, this sweeping action greatly increases the proportion of fuel exposed to the intense activating effect of the electrical arc A.

At the same time, the constantly shifting or migrating location of either terminus of the arc A reduces the erosion of the surfaces as would occur with a fixed arc position.

Exit of the now activated fuel is preferably via the radially extending orifices 158 to overcome the vortical nature of the fuel flow and disperse the activated fuel into the compressed air in combustion chamber 16. Combustion of the activated fuel is substantially instantaneous as it enters the oxidizing atmosphere of compressed air, as described in the above cited patents, with ignition of this activated fuel acting as a torch to ignite the main fuel-air charge.

Figure 6:
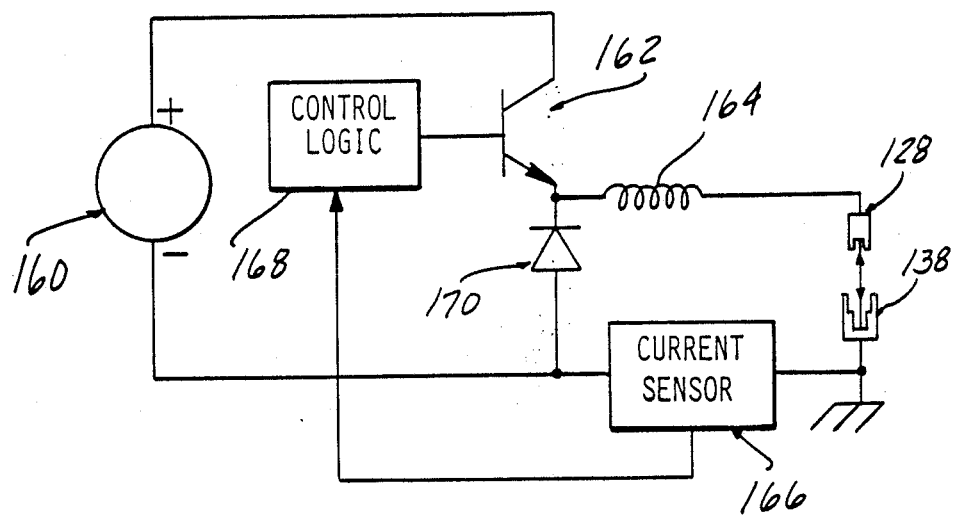
FIG. 6 is a diagrammatic view of the electrical arc driver circuit associated with the electrodes of the injector shown in FIGS. 1 and 2.

FIG. 6 shows a preferred arc driver circuit for sustaining the electrical arc, including a 0-300 v DC power supply connected across the electrodes 128, 138 via a Darlington power transistor 62 and a 3 millihenry "choke" coil 164.

Electrode 138 is connected into the circuit using the engine as circuit ground, and preferably the moving electrode 138 should be electrically connected solely via spring 146 to avoid establishment of sliding electrical contact with the contacting surfaces of the injector holder sleeve 38. For this purpose, an insulating sleeve 141 may be interposed between the skirt portion 140 and the bore 124 in bushing 126.

A current sensor 166 provides feed back to a pulse width modulated current level control logic circuit 168 connected to the base of the Darlington transistor 162 to limit the current across the electrodes 128, 138.

A diode 170 provides a return path for current to flow from choke coil 164 to electrodes 128, 138 as the transistor 162 is cycled to the off condition by circuit 168.

The choke coil 164 provides an increase in voltage needed to sustain the arc as it increases in length, since the decline in current itself generates a voltage in the coil by virtue of its inductance.

The circuit 168 provides the basic timing and control of the injection event as desired for the particular application. Typically, engine crank rotation signals received from an encoder (not shown) are utilized to time the onset of injection in internal combustion engine applications.

It can be appreciated that reliable ignition of lean fuel-air mixtures can be achieved with the above described ignitor without the need for auxiliary combustion chambers, stratified charges, or high energy electrical ignitors, and which minimizes electrode erosion.

We claim:

1. In combination with an internal combustion engine having a combustion chamber wherein a main fuel-air charge is introduced to be burned during each engine cycle said fuel-air charge comprising a lean burn mixture, a torch ignitor for igniting said main fuel-air charge, said torch ignitor, including:
   a first and a second electrode;
   housing means within which said first and second electrodes are confined, said housing means including a tip portion protruding into said combustion chamber, said tip portion including orifice means for directing a quantity of fuel into said combustion chamber;
   means mounting said first and second electrodes in said housing means for movement between a first position whereat said first and second electrodes have surface portions in contact and a second position whereat said first and second electrodes surface portions have a space therebetween, said space being in communication with said orifice means;
   arc driver circuit means operative during each engine cycle to cause a current to flow to said first and second electrodes when said first and second electrodes are in said first position and continuing to cause said current to flow after said first and second electrodes have moved to said second separated position to cause an arc to be established between said electrodes;
   operator means for causing said first and second electrodes to initially be in said first position at the beginning of each engine cycle and subsequently move to said second position during each engine cycle;
   fuel supply means directing a quantity of gaseous fuel under pressure into said space during each engine cycle, after separation of said first and second electrodes to be activated by exposure to said arc, said quantity of gaseous fuel small relative to the quantity of fuel in said main fuel-air charge, said fuel pressurized sufficiently to pass into said combustion chamber through said orifice means after passing through said space, whereby said quantity of gaseous fuel is activated to be ignited upon entering said combustion chamber and thereby igniting the main fuel-air charge therein.

2. The internal combustion engine according to claim 1 further including flow passage means for establishing a vortical flow of said gaseous fuel in passing into said space, and wherein said surface portions of said first and second electrodes comprise annular surfaces defining an annular space therebetween when separated, said gaseous fuel vortical flow causing said arc to migrate about said space.

3. The internal combustion engine according to claim 1 wherein said operator means comprises means for applying said gaseous fuel under pressure to one of said first and second electrodes, causing said separating movement of said first and second electrodes.

4. The internal combustion engine according to claim 2 wherein said flow passage means comprises a spiral passage receiving said quantity of gaseous fuel under pressure, said spiral passage converging on said annular space.

5. The internal combustion engine according to claim 2 wherein said orifice means includes a series of tangential jets receiving said vortical flow of gaseous fuel under pressure.

6. The internal combustion engine according to claim 2 wherein each of said first and second electrodes is formed with open-ended recessed cavities having rims facing each other comprising said annular surfaces, said annular space defined between the rims of said cavities.

7. A method of torch igniting a lean fuel-air main charge in the combustion chamber of an internal combustion engine comprising the steps of:
   activating a small quantity of gaseous fuel by exposing said small quantity of fuel to an electrical arc, and thereafter injecting said activated small quantity of fuel into said main charge in said combustion chamber of said internal combustion engine.

8. The method according to claim 7 wherein said arc is generated by establishing a current between a pair of electrodes in contact and thereafter separating said electrodes to establish said arc in the intermediate space formed by separation of said electrodes.

9. The method according to claim 8 further including the step of causing said arc to migrate about said space while passing said gaseous fuel under pressure through said space.

10. The method according to claim 9 further including the step of impinging the flow of gaseous fuel against said arc so as to cause said migration in said space.

11. The method according to claim 10 further including the step of inducing a vortical flow of said gaseous fuel to cause a rotation of said arc about said space.

12. The method according to claim 8 wherein the step of separating said electrodes includes the step of exerting the pressure of said quantity of gaseous fuel under pressure on one of said electrodes to cause said separation.

* * * * *